US012526051B2

(12) United States Patent
Takeuchi et al.

(10) Patent No.: US 12,526,051 B2
(45) Date of Patent: Jan. 13, 2026

(54) OPTICAL REPEATER AND OPTICAL COMMUNICATION SYSTEM (71) Applicant: NEC Corporation, Tokyo (JP)

(72) Inventors: Takeshi Takeuchi, Tokyo (JP); Satoshi Mikami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 959 days.

(21) Appl. No.: 17/765,513

(22) PCT Filed: Sep. 2, 2020

(86) PCT No.: PCT/JP2020/033260
§ 371 (c)(1),
(2) Date: Mar. 31, 2022

(87) PCT Pub. No.: WO2021/065308
PCT Pub. Date: Apr. 8, 2021

(65) Prior Publication Data
US 2022/0345223 A1    Oct. 27, 2022

(30) Foreign Application Priority Data
Oct. 4, 2019  (JP) ................................. 2019-183666

(51) Int. Cl.
H01S 3/00    (2006.01)
H04B 10/25   (2013.01)
(Continued)

(52) U.S. Cl.
CPC ........... H04B 10/291 (2013.01); H04B 10/25 (2013.01); H04B 10/614 (2013.01)

(58) Field of Classification Search
CPC ........... H01S 3/094061; H01S 3/09408; H04B 10/291; H04B 10/25; H04B 10/614
See application file for complete search history.

(56) References Cited

U.S. PATENT DOCUMENTS 6,327,077 B1      12/2001  Okazaki
2002/0154355 A1*  10/2002  Payne .................. H04B 10/564
                                                  398/94
(Continued)

FOREIGN PATENT DOCUMENTS

JP    H08-304860 A    11/1996
JP    2000-114624 A    4/2000
(Continued)

OTHER PUBLICATIONS

International Search Report for PCT Application No. PCT/JP2020/033260, mailed on Dec. 1, 2020.

Primary Examiner — Mark Hellner
(74) Attorney, Agent, or Firm — Sughrue Mion, PLLC (57) ABSTRACT An object is to provide an optical repeater that improves the fault/tolerance of a plurality of excitation light sources while sharing the excitation light sources among a plurality of optical fibers. An optical repeater includes excitation light sources, optical amplification units, and an optical distribution unit. The optical amplification units amplify optical signals by using lights output from the excitation light sources. The optical distribution unit includes a plurality of optical multiplexing/demultiplexing units. The optical distribution unit is configured in such a manner that the lights from the four different excitation light sources in the excitation light sources to be input to each of the light amplification units.

7 Claims, 10 Drawing Sheets (51) Int. Cl.
  *H04B 10/291* (2013.01)
  *H04B 10/61* (2013.01)

(56) References Cited

U.S. PATENT DOCUMENTS

| | | | |
|---|---|---|---|
| 2006/0140633 A1 | 6/2006 | Chaput | |
| 2019/0280452 A1* | 9/2019 | Inada | H01S 3/091 |
| 2019/0348812 A1 | 11/2019 | Kawai | |
| 2021/0044075 A1* | 2/2021 | Mikami | H01S 3/2308 |

FOREIGN PATENT DOCUMENTS

| | | |
|---|---|---|
| JP | 2002-139754 A | 5/2002 |
| JP | 2002-221742 A | 8/2002 |
| JP | 2014-160908 A | 9/2014 |
| JP | 2015-023404 A | 2/2015 |
| WO | 2018/097074 A1 | 5/2018 |
| WO | WO 2019176205 A1 * | 9/2019 ........... H01S 3/0912 |

* cited by examiner

OPTICAL REPEATER AND OPTICAL COMMUNICATION SYSTEM

This application is a National Stage Entry of PCT/JP2020/033260 filed on Sep. 2, 2020, which claims priority from Japanese Patent Application 2019-183666 filed on Oct. 4, 2019, the contents of all of which are incorporated herein by reference, in their entirety.

TECHNICAL FIELD

The present invention relates to an optical repeater and an optical communication system.

BACKGROUND ART

In an optical communication system such as a submarine optical cable system, one or more optical repeaters are inserted into a transmission path to compensate for attenuation of an optical signal. The optical repeater includes an optical amplifier for amplifying the optical signal. As such an optical amplifier, an erbium-doped fiber amplifier (EDFA) capable of directly amplifying the optical signal is used.

When an EDFA is used in an optical repeater, it is required to continue the optical amplification by the EDFA even if a failure of an excitation light source occurs. For example, there has been proposed a redundant configuration in which an excitation light obtained by multiplexing lights output from a plurality of excitation light sources are input to the EDFA so as to continue supplying the excitation light even if a part of the excitation light sources fails (Patent Literatures 1 to 3).

CITATION LIST

Patent Literature

[Patent Literature 1] International Patent Publication No. WO2018/097074
[Patent Literature 2] Japanese Unexamined Patent Application Publication No. 2015-23404
[Patent Literature 3] Japanese Unexamined Patent Application Publication No. 2014-160908

SUMMARY OF INVENTION

Technical Problem

In recent years, the number of optical fibers housed in a submarine optical cable has been increasing to realize a large capacity network. For example, a configuration in which ten or more optical fibers are housed in one submarine cable is used. As the number of optical fibers increases, it is desired to efficiently share the excitation light sources for supplying the excitation lights to the optical amplifiers amplifying optical signals transmitted by the optical fibers. To realize a redundant configuration in which the excitation light sources are shared, it is required to reduce the number of the excitation light sources and to ensure the resistance against failure of the excitation light sources.

The present invention has been made in view of the aforementioned circumstances and aims to provide an optical repeater that improves the fault tolerance of a plurality of excitation light sources while sharing the excitation light sources among a plurality of optical fibers.

Solution to Problem

An aspect of the present disclosure is an optical repeater including: five or more excitation light sources; a plurality of optical amplification units each configured to amplify an optical signal by using lights output from the excitation light sources; and an optical distribution unit including a plurality of optical multiplexing/demultiplexing units, in which the optical distribution unit is configured in such a manner that the lights output from four different excitation light sources in the five or more excitation light sources are input each light amplification unit in the plurality of light amplification units.

An aspect of the present disclosure is an optical communication system including: an optical transmission apparatus; an optical cable through which an optical signal transmitted and received by the optical transmission apparatus is transmitted; and an optical repeater inserted into the optical cable, in which the optical repeater comprises: five or more excitation light sources; a plurality of optical amplification units each configured to amplify an optical signal by using lights output from the excitation light sources; and an optical distribution unit including a plurality of optical multiplexing/demultiplexing units, and the optical distribution unit is configured in such a manner that the lights output from four different excitation light sources in the five or more excitation light sources are input each light amplification unit in the plurality of light amplification units.

Advantageous Effects of Invention

According to the present disclosure, it is possible to provide an optical repeater that improves the fault tolerance of a plurality of excitation light sources while sharing the excitation light sources among a plurality of optical fibers.

DESCRIPTION OF EMBODIMENTS

Example embodiments of the present invention will be described below with reference to the drawings. The same components are denoted by the same reference numerals throughout the drawings, and a repeated explanation is omitted as needed.

First Example Embodiment

An optical repeater according to a first example embodiment will be described. The optical repeater according to the present example embodiment is configured to be inserted into an optical cable housing a plurality of optical fibers for connecting a plurality of optical transmission apparatuses disposed in a plurality of terminal stations. The optical cable is, for example, a submarine optical cable laid on the seabed.

Figure 1:
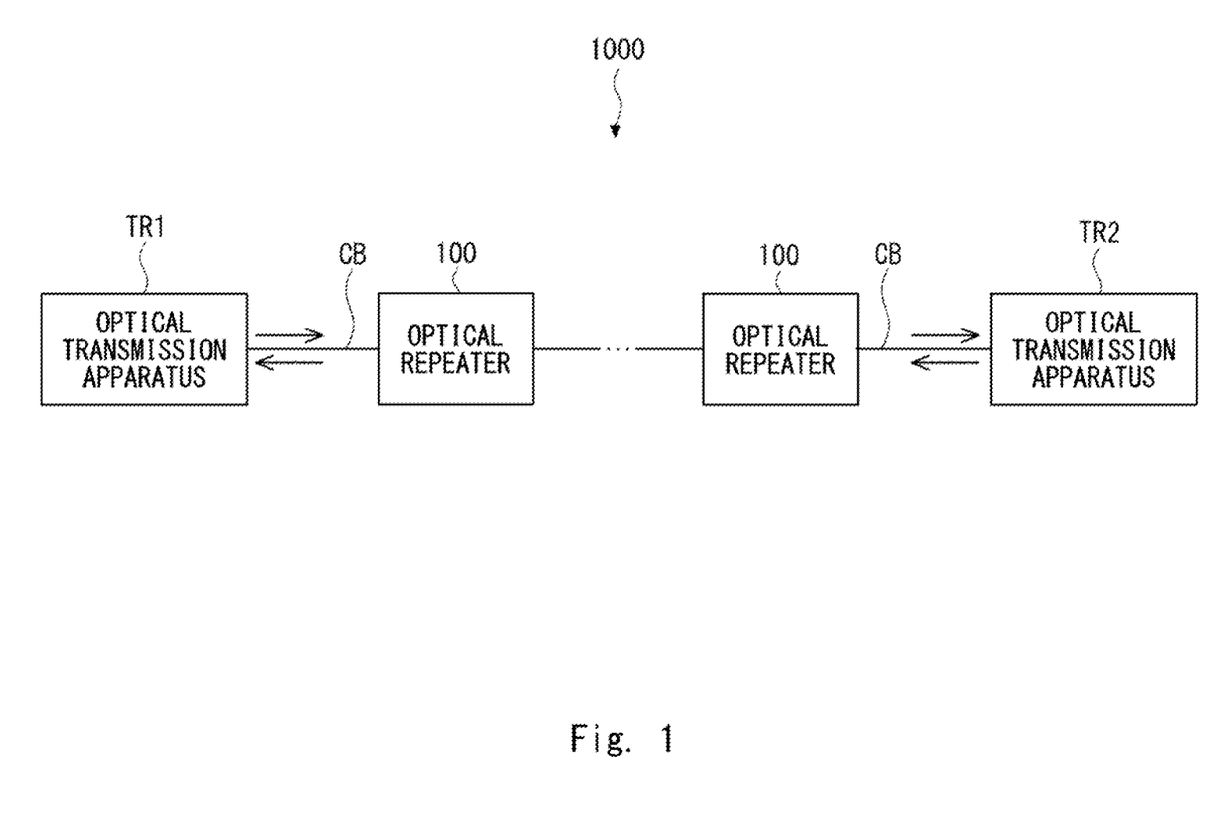
FIG. 1 is a diagram showing a basic configuration of an optical communication system including optical repeaters according to a first example embodiment.

FIG. 1 shows a basic configuration of an optical communication system 1000 including optical repeaters 100 according to the first example embodiment. In the present configuration, the optical communication system 1000 includes an optical transmission apparatus TR1 disposed at one terminal station, an optical transmission apparatus TR2 disposed at the other terminal station, a plurality of optical repeaters 100, and an optical cable CB.

The optical transmission apparatus TR1 and the optical transmission apparatus TR2 are optically connected by the optical cable CB housing a plurality of optical fibers. The optical cable CB is configured as an optical transmission path enabling bidirectional optical communication between the optical transmission apparatus TR1 and the optical transmission apparatus TR2.

One or more optical repeaters 100 are inserted into the optical cable CB to amplify an optical signal attenuated by transmission through each optical fiber.

Figure 2:
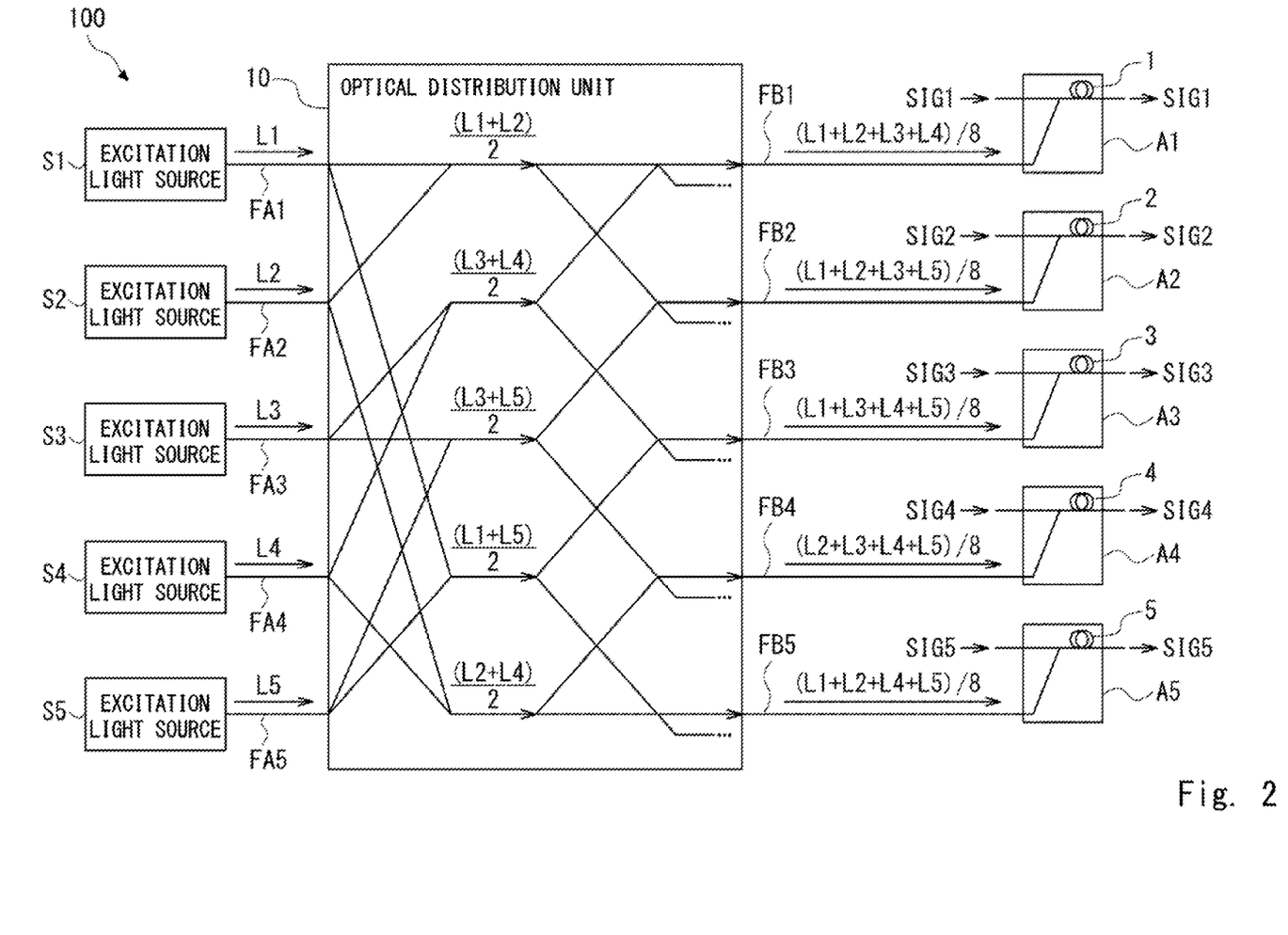
FIG. 2 is a diagram schematically showing a configuration of the optical repeater according to the first example embodiment.

Next, a configuration of the optical repeater 100 according to the first example embodiment will be described. FIG. 2 schematically shows the configuration of the optical repeater 100 according to the first example embodiment. The optical repeater 100 includes excitation light sources S1 to S5, an optical distribution unit 10, and optical amplification units A1 to A5. The excitation light sources S1 to S5 output lights L1 to L5 to an optical distribution unit 10 through optical fibers FA1 to FA5, respectively.

The optical distribution unit 10 is an optical distribution circuit for branching the lights L1 to L5 and distributing them to the optical amplification units A1 to A5, respectively, and configured to cause each of the optical amplification units A1 to A5 to receive the lights output from four different excitation light sources. As shown in FIG. 2, the optical amplification unit A1 receives each of the lights L1 to L4 by ¼ through the optical fiber FB1. The optical amplification unit A2 receives each of the lights L1 to L3, and L5 by ¼ through the optical fiber FB2. The optical amplification unit A3 receives each of the lights L1 and L3 to L5 by ¼ through the optical fiber FB3. The optical amplifying unit A4 receives each of the lights L2 to L5 by ¼ through the optical fiber FB4. The optical amplifying unit A5 receives each of the lights L1, L2, L4, and L5 by ¼ through the optical fiber FB5.

The optical amplification units A1 to A5 are configured as optical amplifiers that directly amplify optical signals SIG1 to SIG5 by using the lights received from the optical distribution unit 10 as excitation lights. The optical amplification units A1 to A5 are configured to include an erbium-doped fiber amplifier (EDFA) provided with an erbium-doped fibers (EDFs) 1 to 5. The EDFs 1 to 5 are excited by the excitation lights, the optical signals SIG1 to SIG5 are incident on the EDFs 1 to 5 in excited states, and thereby the optical signals SIG1 to SIG5 are amplified, respectively.

Figure 3:
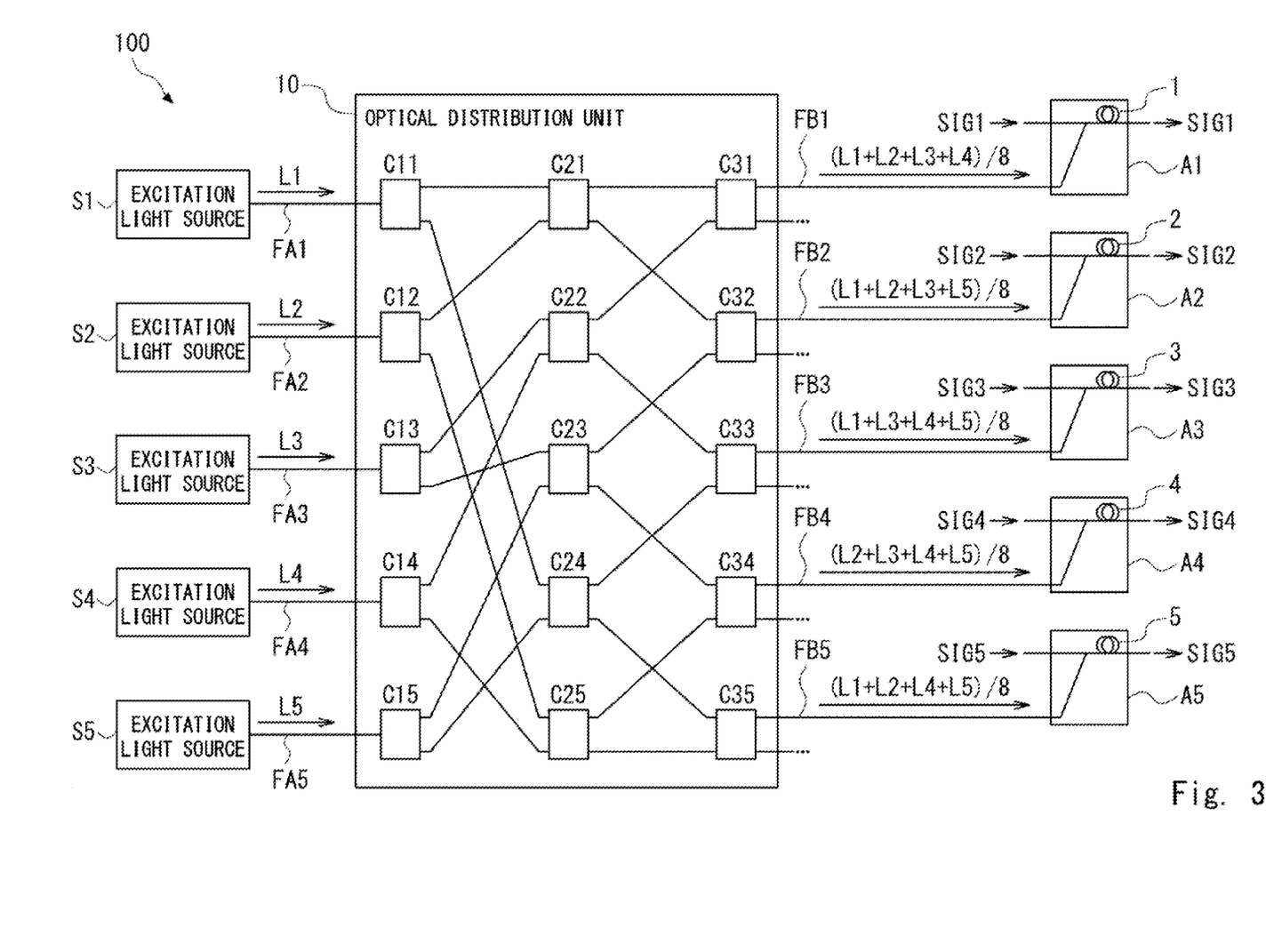
FIG. 3 is a diagram showing the configuration of the optical repeater according to the first example embodiment in more detail.
Figure 4:
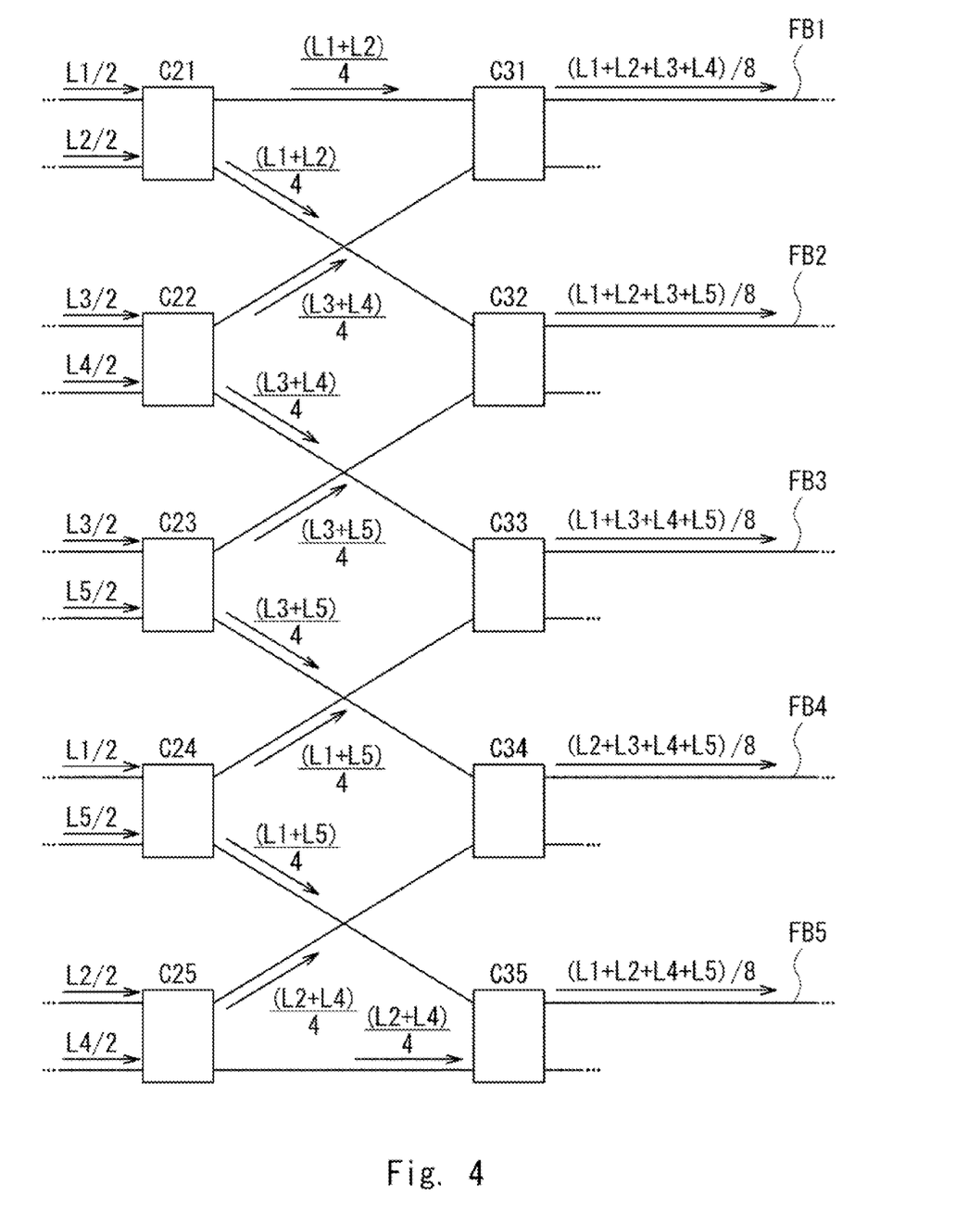
FIG. 4 is a diagram schematically showing optical paths in an optical distribution unit according to the first example embodiment.

Next, a configuration of the optical distribution unit 10 will be described in detail. FIG. 3 shows the configuration of the optical repeater 100 according to the first example embodiment in more detail. FIG. 4 schematically shows optical paths in the optical distribution unit 10 according to the first example embodiment. The optical distribution unit 10 includes optical multiplexing/demultiplexing units C11 to C15, C21 to C25, and C31 to C35. Hereinafter, the optical multiplexing/demultiplexing units C11 to C15 are also referred to as first optical multiplexing/demultiplexing units, the optical multiplexing/demultiplexing units C21 to C25 are also referred to as second optical multiplexing/demultiplexing units, and the optical multiplexing/demultiplexing units C31 to C35 are also referred to as third optical multiplexing/demultiplexing units.

In the present example embodiment, the optical multiplexing/demultiplexing units are arranged in three columns and five rows (3×5 matrix). Here, when i is a column number which is an integer from 1 to 3 and j is a row number which is an integer from 1 to 5, the optical multiplexing/demultiplexing unit of the i-th column and the j-th row can be expressed as Cij.

The optical multiplexing/demultiplexing units C11 to C15 are one-input/two-output (1×2) optical multiplexing/demultiplexing units, and are configured as, for example, optical couplers. The inputs (input ports) of the optical multiplexing/demultiplexing units C11 to C15 are optically connected to the excitation light sources S1 to S5 through the optical fibers FA1 to FA5, respectively.

The optical multiplexing/demultiplexing units C21 to C25 are two-input/two-output (2×2) optical multiplexing/demultiplexing units, and are configured as, for example, optical couplers. The two outputs (output ports) of the optical multiplexing/demultiplexing units C11 to C15 are optically connected to different two of the optical multiplexing/demultiplexing units C21 to C25 through optical fibers.

That is, the optical multiplexing/demultiplexing units C11 to C15 receive the lights L1 to L5 from the excitation light sources S1 to S5, respectively, branch the received lights into two, and output them to different two of the optical multiplexing/demultiplexing units C21 to C25.

In the configuration shown in FIG. 3, one output of the optical multiplexing/demultiplexing unit C11 is optically connected to one input of the optical multiplexing/demultiplexing unit C21, and the other output of the optical multiplexing/demultiplexing unit C11 is optically connected to one input of the optical multiplexing/demultiplexing unit C24. One output of the optical multiplexing/demultiplexing unit C12 is optically connected to the other input of the optical multiplexing/demultiplexing unit C21, and the other output of the optical multiplexing/demultiplexing unit C12 is optically connected to one input of the optical multiplexing/demultiplexing unit C25. One output of the optical multiplexing/demultiplexing unit C13 is optically connected to one input of the optical multiplexing/demultiplexing unit C22, and the other output of the optical multiplexing/demultiplexing unit C13 is optically connected to one input of the optical multiplexing/demultiplexing unit C23. One output of the optical multiplexing/demultiplexing unit C14 is optically connected to the other input of the optical multiplexing/demultiplexing unit C22, and the other output of the optical multiplexing/demultiplexing unit C14 is optically connected to the other input of the optical multiplexing/demultiplexing unit C25. One output of the optical multiplexing/demultiplexing unit C15 is optically connected to the other input of the optical multiplexing/demultiplexing unit C23, and the other output of the optical multiplexing/demultiplexing unit C15 is optically connected to the other input of the optical multiplexing/demultiplexing unit C24.

The optical multiplexing/demultiplexing units C31 to C35 are two-input/two-output (2×2) optical multiplexing/demultiplexing units, and are configured as, for example, optical couplers. The two outputs (output ports) of the optical multiplexing/demultiplexing units C21 to C25 are optically connected to different two of the optical multiplexing/demultiplexing units C31 to C35 through optical fibers. One of the two outputs (output ports) of the optical multiplexers C31 to C35 is optically connected to the optical amplification units A1 to A5 through the optical fibers FB1 to FB5, respectively. That is, each of the optical multiplexing/demultiplexing units C31 to C35 receives the lights from different two of the optical multiplexing/demultiplexing units C21 to C25, multiplexes the received lights, branch the multiplexed light into two. Then, the optical multiplexing/demultiplexing units C31 to C35 output the branched lights, each of which is one of the two branched lights, to the optical amplification units A1 to A5, respectively.

In the present configuration, the optical multiplexing/demultiplexing unit in the m-th (m is an integer from 2 to 4) row in the optical multiplexing/demultiplexing units C21 to C25 is optically connected to the optical multiplexing/demultiplexing units in the (m−1)-th row and the (m+1)-th row in the optical multiplexing/demultiplexing units C31 to C35. The optical multiplexing/demultiplexing unit C21 is optically connected to the optical multiplexing/demultiplexing unit C31 in the same row and the optical multiplexing/demultiplexing unit C32 in the adjacent row, and the optical multiplexing/demultiplexing unit C25 is optically connected to the optical multiplexing/demultiplexing unit C35 in the same row and the optical multiplexing/demultiplexing unit C34 in the adjacent row.

That is, in the present configuration, the optical multiplexing/demultiplexing units in the second column of the first and last rows (the first and fifth rows) are optically connected to the optical multiplexing/demultiplexing unit in the third column of the same row and the optical multiplexing/demultiplexing unit in the third column of the adjacent row, respectively. The optical multiplexing/demultiplexing units in the second column of the rows (That is, the second to fourth rows) other than the first and last rows (the first and fifth rows) are optically connected to the optical multiplexing/demultiplexing units in the third column of the two adjacent rows, respectively.

Specifically, in the configuration shown in FIG. 3, one output of the optical multiplexing/demultiplexing unit C21 is optically connected to one input of the optical multiplexing/demultiplexing unit C31, and the other output of the optical multiplexing/demultiplexing unit C21 is optically connected to one input of the optical multiplexing/demultiplexing unit C32. One output of the optical multiplexing/demultiplexing unit C22 is optically connected to the other input of the optical multiplexing/demultiplexing unit C31, and the other output of the optical multiplexing/demultiplexing unit C22 is optically connected to one input of the optical multiplexing/demultiplexing unit C33. One output of the optical multiplexing/demultiplexing unit C23 is optically connected to the other input of the optical multiplexing/demultiplexing unit C32, and the other output of the optical multiplexing/demultiplexing unit C23 is optically connected to one input of the optical multiplexing/demultiplexing unit C34. One output of the optical multiplexing/demultiplexing unit C24 is optically connected to the other input of the optical multiplexing/demultiplexing unit C33, and the other output of the optical multiplexing/demultiplexing unit C24 is optically connected to one input of the optical multiplexing/demultiplexing unit C35. One output of the optical multiplexing/demultiplexing unit C25 is optically connected to the other input of the optical multiplexing/demultiplexing unit C34, and the other output of the optical multiplexing/demultiplexing unit C25 is optically connected to the other input of the optical multiplexing/demultiplexing unit C35.

In other words, the two adjacent optical multiplexing/demultiplexing units (C21 and C22, C22 and C23, C23 and C24, C24 and C25) in the second column are optically connected to the two adjacent optical multiplexing/demultiplexing units in the third column in a crisscross manner (in a cross shape). However, as described above, in the first and last rows (the first and fifth rows), the multiplexing/demultiplexing unit in the second column and the optical multiplexing/demultiplexing unit in the third column of the same row are optically connected.

The connection relationship between the optical multiplexing/demultiplexing units C11 to C15 in the first column and the optical multiplexing/demultiplexing units C21 to C25 in the second column satisfies the following conditions.

First Condition

Each of the optical multiplexing/demultiplexing units C21 to C25 in the second column is optically connected to different two of the optical multiplexing/demultiplexing units C11 to C15 in the first column.

Second Condition

The optical multiplexing/demultiplexing unit in the k-th row (k is an integer from 1 to 3) and the optical multiplexing/demultiplexing unit in (k+2)-th row, which is two adjacent to the k-th row, in the optical multiplexing/demultiplexing units C21 to C25 in the second column are not connected to the same one of the optical multiplexing/demultiplexing units C11 to C15 in the first column. Specifically, the optical multiplexing/demultiplexing unit C21 is connected to the optical multiplexing/demultiplexing units C11 and C12 in the first row, the optical multiplexing/demultiplexing unit C23 is connected to the optical multiplexing/demultiplexing units C13 and C15 of the first row, and thus the optical multiplexing/demultiplexing units C21 and C23 are not connected to the same optical multiplexing/demultiplexing unit in the first row. Similarly, the optical multiplexing/demultiplexing unit C22 is connected to the optical multiplexing/demultiplexing units C13 and C14 in the first row, the optical multiplexing/demultiplexing unit C24 is connected to the optical multiplexing/demultiplexing units C11 and C15 in the first row, and thus the optical multiplexing/demultiplexing units C22 and C24 are not connected to the same optical multiplexing/demultiplexing unit in the first row. The optical multiplexing/demultiplexing unit C23 is connected to the optical multiplexing/demultiplexing units C13 and C15 in the first row, the optical multiplexing/demultiplexing unit C25 is connected to the optical multiplexing/demultiplexing units C12 and C14 in the first row, and thus the optical multiplexing/demultiplexing units C23 and C25 are not connected to the same optical multiplexing/demultiplexing unit in the first row.

According to the present configuration, a redundant configuration in which each of the optical amplification units A1 to A5 receives each of the lights output from the four different excitation light sources by ⅛ is realized. In other words, when it is assumed that the intensity of each of the lights L1 to L5 output from the excitation light sources S1 to S5 is "100", it can be understood that the intensity of the light received by each of the optical amplification units A1 to A5 as the excitation light is "50" that is four times 100/8.

Thus, even if any of the excitation light sources S1 to S5 fails and the output of the light is stopped, the intensity of the excitation light received by each of the optical amplification units A1 to A5 becomes "37.5", and the output of the excitation light to the optical amplification unit is not interrupted, while the intensity of the excitation light decreases. Therefore, according to the present configuration, it is possible to provide the optical repeater that can continue relaying the optical signal even if the excitation light source fails.

Further, in the optical repeater according to the present example embodiment, even if one excitation light source fails, only a part of the optical amplification units is affected, so that the influence of the failure of the excitation light source on the relay of the optical signal can be reduced.

Further, since the number of excitation light sources can be reduced as compared with a general redundant configuration, it is possible to simplify the configuration and to achieve the cost reduction. Further, since the light output from the excitation light source only passes through the three optical multiplexing/demultiplexing units, it is also possible to suppress loss due to optical multiplexing/demultiplexing units.

In the above description, the example in which the optical repeater includes the five excitation light sources and the five optical amplification units has been described. However, the number of excitation light sources and the number of optical amplification units are not limited thereto. That is, when N is an integer of 5 or more, as long as the first and second conditions are satisfied, the optical repeater may have N excitation light sources and N optical amplification units. In this case, k is an integer from 1 to (N−2), and m is an integer from 2 to (N−1).

Comparative Example

Figure 5:
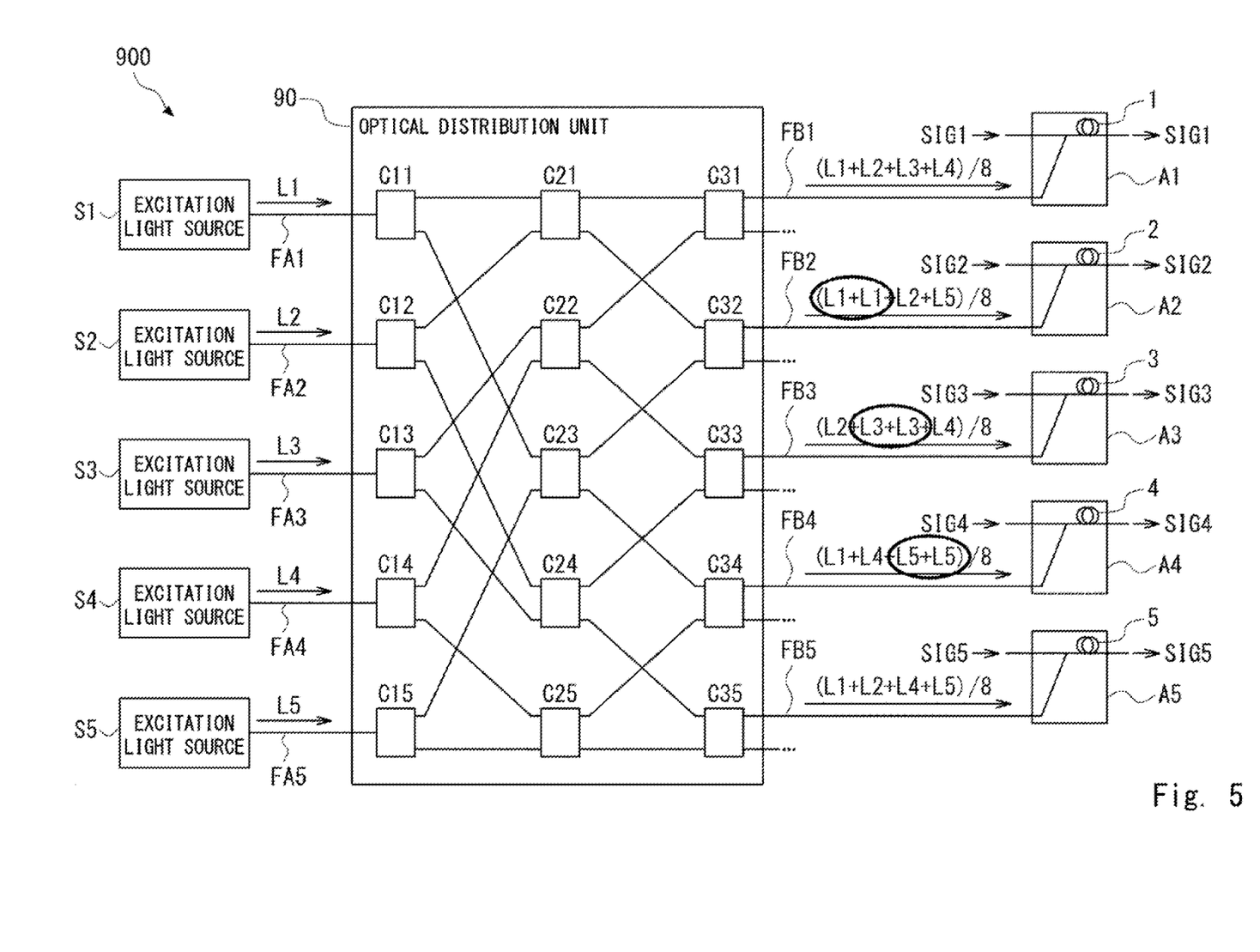
FIG. 5 is a diagram schematically showing a configuration example of an optical repeater according to a comparative example.
Figure 6:
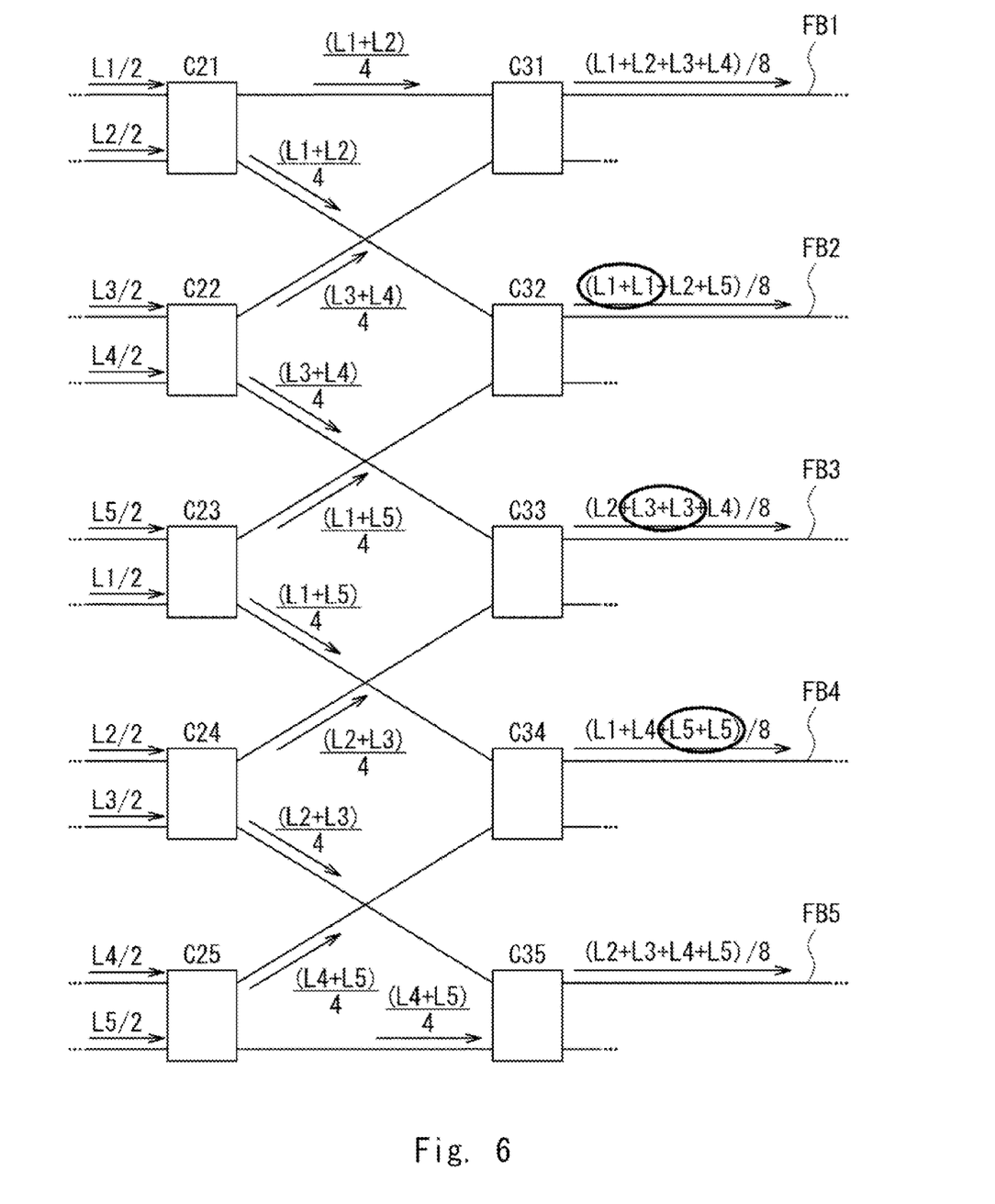
FIG. 6 is a diagram schematically showing optical paths in an optical distribution unit according to the comparative example.

Here, a comparative example having a configuration that does not satisfy the above second condition will be considered. FIG. 5 schematically shows a configuration example of an optical repeater 900 according to the comparative example. FIG. 6 schematically shows optical paths in an optical distribution unit 90 according to the comparative example.

In the comparative example of FIG. 5, unlike the optical distribution unit 10, the optical distribution unit 90 has a connection relationship in which two of the lights L1 to L5 are sequentially input to the optical multiplexing/demultiplexing units C21 to C25. In this case, the optical multiplexing/demultiplexing unit C21 and the optical multiplexing/demultiplexing unit C23 two adjacent to the optical multiplexing/demultiplexing unit C21 are connected to the same optical multiplexing/demultiplexing unit C11, and thus the second condition is not satisfied. Similarly, the optical multiplexing/demultiplexing unit C22 and the optical multiplexing/demultiplexing unit C24 two adjacent to the optical multiplexing/demultiplexing unit C22 are connected to the same optical multiplexing/demultiplexing unit C13, the optical multiplexing/demultiplexing unit C23 and the optical multiplexing/demultiplexing unit C25 two adjacent to the optical multiplexing/demultiplexing unit C23 are connected to the same optical multiplexing/demultiplexing unit C15, and thus the second condition is not satisfied.

As a result, as shown by the circles in FIGS. 5 and 6, the lights L1 are redundantly included in the excitation light output to the optical amplification unit A2. The lights L3 are redundantly included in the excitation light output to the optical amplification unit A3. The lights L5 are redundantly included in the excitation light output to the optical amplification unit A4. Therefore, if any of the excitation light sources S1, S3, and S5 fails, the intensity of these excitation lights decreases to ½. Therefore, it can be understood that the optical repeater 900 according to the comparative example is less resistant to the failure of the excitation light source than the optical repeater 100 according to the present example embodiment.

As described above, even in the case in which the optical distribution unit is configured of the same number of optical multiplexing/demultiplexing units, the optical distribution unit in the present example embodiment can be configured to enhance the resistance against the failure of the excitation light sources by satisfying the above first and second conditions.

Second Example Embodiment

Figure 7:
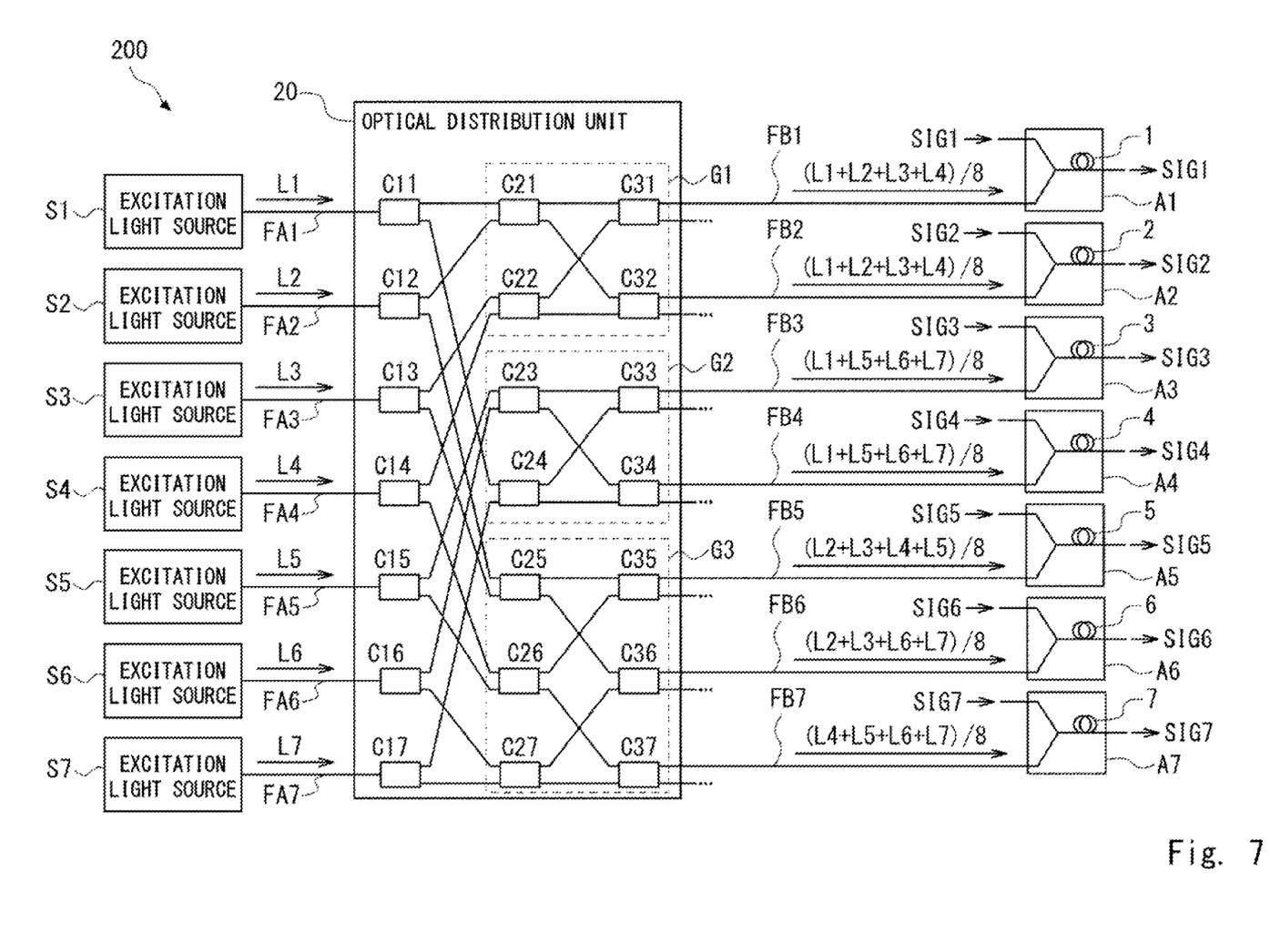
FIG. 7 is a diagram schematically showing a configuration of an optical repeater according to a second example embodiment.

An optical repeater according to a second example embodiment will be described. FIG. 7 schematically shows a configuration of an optical repeater 200 according to the second example embodiment. In the optical repeater 200, the number of the excitation light sources and the number of the optical amplification units are increased by two as compared with the optical repeater 100, and therefore, a configuration of an optical distribution unit is different from that of the optical repeater 100.

The optical repeater 200 has a configuration in which excitation light sources S6 and S7 and optical amplification units A6 and A7 are added and the optical distribution unit 10 is replaced with an optical distribution unit 20 as compared with the optical repeater 100. The excitation light sources S6 and S7 have the same structure as the excitation light sources S1 to S5. The optical amplification units A6 and A7 have the same structure as the optical amplification units A1 to A5.

The excitation light sources S1 to S7 output lights L1 to L7 through the optical fibers FA1 to FA7, respectively, to the optical distribution unit 20.

The optical distribution unit 20 is an optical distribution circuit that branches the lights L1 to L7 and distributes them to the optical amplification units A1 to A7, and, like the optical distribution unit 10, and configured to cause each of the optical amplification units A1 to A7 to receive the lights output from four different excitation light sources.

As described above, the optical amplification units A6 and A7 have the same structure as the optical amplification units A1 to A5. The optical amplification units A6 and A7 are EDFAs provided with EDFs 6 and 7, and the optical signals SIG1 to SIG7 are amplified when the optical signals SIG1 to SIG7 are incident on the EDFs 6 and 7 excited by the excitation lights received from the optical distribution unit 20.

Next, a configuration of the optical distribution unit 20 will be described in detail. The optical distribution unit 20 has a configuration in which optical multiplexing/demultiplexing units C16, 17, C26, C27, C36, and C37 are added and a connection relationship of the optical multiplexing/demultiplexing units is changed as compared with the optical distribution unit 10.

The optical multiplexing/demultiplexing units C16 and C17 are one-input/two-output (1×2) optical multiplexing/demultiplexing units having the same configuration as the optical multiplexing/demultiplexing units C11 to C15, and are configured as, for example, optical couplers. The inputs (input ports) of the optical multiplexing/demultiplexing parts C16 and C17 are optically connected to the excitation light sources S6 and S7 through the optical fibers FA6 and FA7, respectively.

The optical multiplexing/demultiplexing units C26 and C27 are two-input/two-output (2×2) optical multiplexing/demultiplexing units having the same configuration as the optical multiplexing/demultiplexing units C21 to C25, and are configured as, for example, optical couplers. The two outputs (output ports) of the optical multiplexing/demultiplexing units C16 and C17 are optically connected to different two of the optical multiplexing/demultiplexing units C21 to C27 through the optical fibers.

In the configuration shown in FIG. 7, one output of the optical multiplexing/demultiplexing unit C11 is optically connected to one input of the optical multiplexing/demultiplexing unit C21, and the other output of the optical multiplexing/demultiplexing unit C11 is optically connected to one input of the optical multiplexing/demultiplexing unit C24. One output of the optical multiplexing/demultiplexing unit C12 is optically connected to the other input of the optical multiplexing/demultiplexing unit C21, and the other output of the optical multiplexing/demultiplexing unit C12 is optically connected to one input of the optical multiplexing/demultiplexing unit C25. One output of the optical multiplexing/demultiplexing unit C13 is optically connected to one input of the optical multiplexing/demultiplexing unit C22, and the other output of the optical multiplexing/demultiplexing unit C13 is optically connected to the other input of the optical multiplexing/demultiplexing unit C25. One output of the optical multiplexing/demultiplexing unit C14 is optically connected to the other input of the optical multiplexing/demultiplexing unit C22, and the other output of the optical multiplexing/demultiplexing unit C14 is optically connected to one input of the optical multiplexing/demultiplexing unit C26. One output of the optical multiplexing/demultiplexing unit C15 is optically connected to one input of the optical multiplexing/demultiplexing unit C23, and the other output of the optical multiplexing/demultiplexing unit C15 is optically connected to the other input of the optical multiplexing/demultiplexing unit C26. One output of the optical multiplexing/demultiplexing unit C16 is optically connected to the other input of the optical multiplexing/demultiplexing unit C23, and the other output of the optical multiplexing/demultiplexing unit C16 is optically connected to one input of the optical multiplexing/demultiplexing unit C27. One output of the optical multiplexing/demultiplexing unit C17 is optically connected to the other input of the optical multiplexing/demultiplexing unit C24, and the other output of the optical multiplexing/demultiplexing unit C17 is optically connected to the other input of the optical multiplexing/demultiplexing unit C27.

The optical multiplexing/demultiplexing units C36 and C37 are two-input/two-output (2×2) optical multiplexing/demultiplexing units having the same configuration as the optical multiplexing/demultiplexing units C31 to C35, and are configured as, for example, optical couplers.

The two outputs (output ports) of the optical multiplexing/demultiplexing units C21 to C27 are optically connected to different two of the optical multiplexing/demultiplexing units C31 to C37 through an optical fiber. In the present configuration, the connections of the optical multiplexing/demultiplexing units C21 to C27 and C31 to C37 are divided into three groups. In FIG. 7, the optical multiplexing/demultiplexing units C21, C22, C31, and C32 in the first and second rows form a group G1. The optical multiplexing/demultiplexing units C23, C24, C33 and C34 in the third and fourth rows form a group G2. The optical multiplexing/demultiplexing units C25 to C27 and C35 to C37 in the fifth to seventh rows form a group G3.

Figure 8:
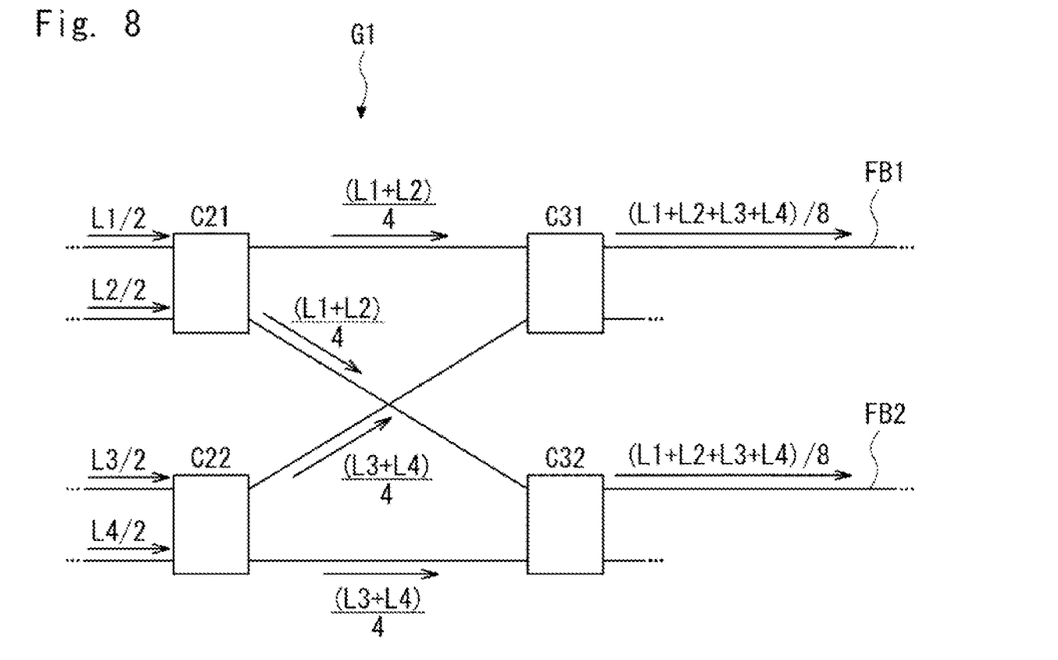
FIG. 8 is a diagram schematically showing optical paths in a group of optical distribution units according to the second example embodiment.

FIG. 8 schematically shows optical paths in the group G1 in the optical distribution unit 20 according to the second example embodiment. One output of the optical multiplexing/demultiplexing unit C21 is optically connected to one input of the optical multiplexing/demultiplexing unit C31, and the other output of the optical multiplexing/demultiplexing unit C21 is optically connected to one input of the optical multiplexing/demultiplexing unit C32. One output of the optical multiplexing/demultiplexing unit C22 is optically connected to the other input of the optical multiplexing/demultiplexing unit C31, and the other output of the optical multiplexing/demultiplexing unit C22 is optically connected to the other input of the optical multiplexing/demultiplexing unit C32.

Figure 9:
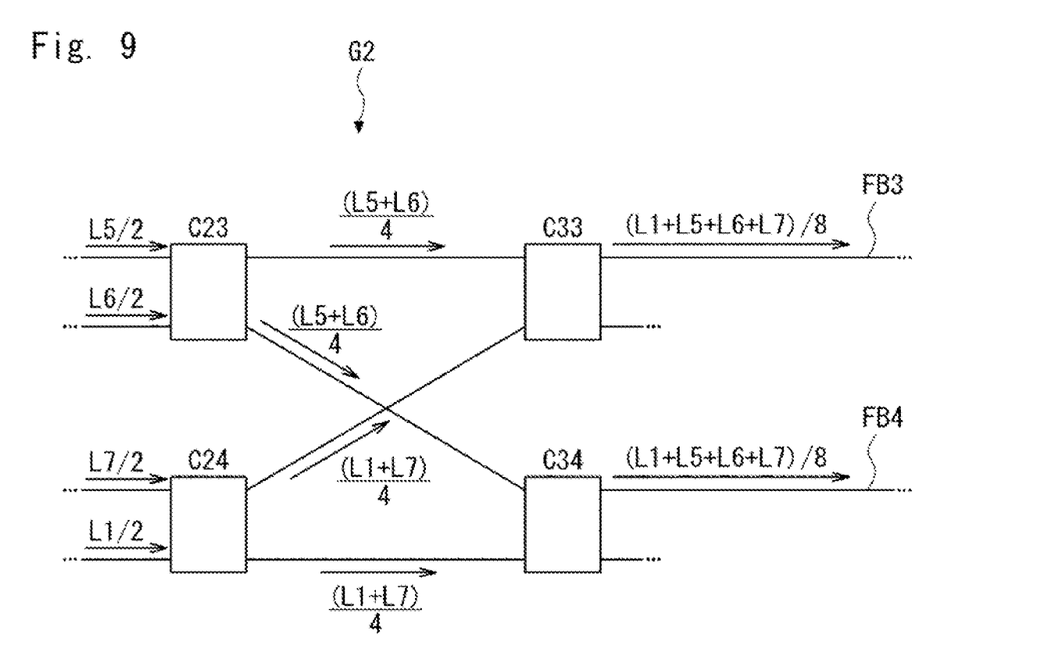
FIG. 9 is a diagram schematically showing optical paths in a group of optical distribution units according to the second example embodiment.

FIG. 9 schematically shows optical paths in the group G2 in the optical distribution unit 20 according to the second example embodiment. One output of the optical multiplexing/demultiplexing unit C23 is optically connected to one input of the optical multiplexing/demultiplexing unit C33, and the other output of the optical multiplexing/demultiplexing unit C23 is optically connected to one input of the optical multiplexing/demultiplexing unit C34. One output of the optical multiplexing/demultiplexing unit C24 is optically connected to the other input of the optical multiplexing/demultiplexing unit C33, and the other output of the optical multiplexing/demultiplexing unit C24 is optically connected to the other input of the optical multiplexing/demultiplexing unit C34.

Figure 10:
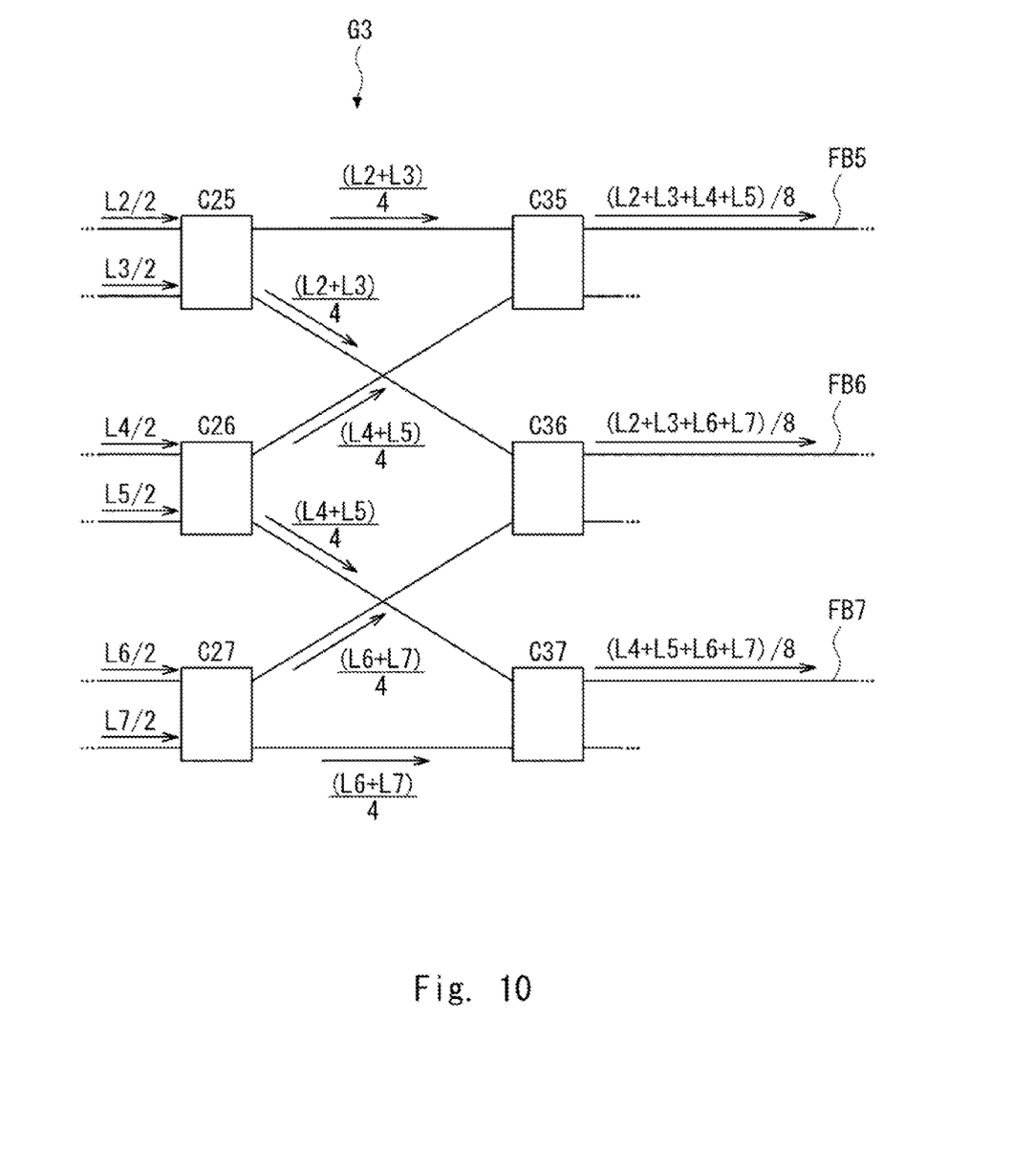
FIG. 10 is a diagram schematically showing optical paths in a group of optical distribution units according to the second example embodiment.

FIG. 10 schematically shows optical paths in the group G3 in the optical distribution unit 20 according to the second example embodiment. One output of the optical multiplexing/demultiplexing unit C25 is optically connected to one input of the optical multiplexing/demultiplexing unit C35, and the other output of the optical multiplexing/demultiplexing unit C25 is optically connected to one input of the optical multiplexing/demultiplexing unit C36. One output of the optical multiplexing/demultiplexing unit C26 is optically connected to the other input of the optical multiplexing/demultiplexing unit C35, and the other output of the optical multiplexing/demultiplexing unit C26 is optically connected to one input of the optical multiplexing/demultiplexing unit C37. One output of the optical multiplexing/demultiplexing unit C27 is optically connected to the other input of the optical multiplexing/demultiplexing unit C36, and the other output of the optical multiplexing/demultiplexing unit C27 is optically connected to the other input of the optical multiplexing/demultiplexing unit C37.

In other words, in each group, as in the first example embodiment, the two optical multiplexing/demultiplexing units adjacent to each other in the second row are connected to the two optical multiplexing/demultiplexing units similarly adjacent to each other in the third row in a crisscross manner as in the first example embodiment. However, in the first and last rows, the optical multiplexing/demultiplexing units in the second and third columns in the same row are optically connected.

According to the above configuration, the excitation lights are input to the optical amplification units A1 to A7, and each excitation light includes each of the lights output from the four different excitation light sources by ⅛. The optical amplification units A1 and A2 receive each of the lights L1 to L4 by ⅛ through the optical fibers FB1 and FB2. The optical amplification units A3 and A4 receive each of the lights L1 and L5 to L7 by ⅛ through the optical fibers FB3 and FB4. The optical amplification unit A5 receives each of the lights L2 to L5 by ⅛ through the optical fiber FB5. The optical amplification unit A6 receives each of the lights L2, L3, L6, and L7 by ⅛ through the optical fiber FB6. The optical amplification unit A7 receives each of the lights L4 to L7 by ⅛ through the optical fiber FB7.

As described above, according to the present configuration, as in the first example embodiment, the redundant configuration is realized in which each of the optical amplification units A1 to A7 receives each of the lights output from four different excitation light sources by ⅛. Thus, even if any of the excitation light sources S1 to S7 fails and the output of the light is stopped, the output of the excitation lights to the optical amplifying units is not interrupted, while the intensities of the excitation lights are lowered. Therefore, it is possible to provide the optical repeater that can continue relaying the optical signal even if the excitation light source fails.

Further, as in the first example embodiment, the influence of the failure of the excitation light source on the relay of the optical signal can be reduced, and the number of the excitation light sources can be reduced as compared with the general redundant configuration, and it is possible to simplify the configuration and to achieve the cost reduction.

Further, according to the present configuration, each of the first group configured of the four optical multiplexing/demultiplexing units and the second group configured of the six optical multiplexing/demultiplexing units can be configured as one unit in advance. For example, when the number of rows N of the arrangement of the optical multiplexing/demultiplexing units of the optical distribution unit is an even number of 6 or more, a plurality of the first groups corresponding to the optical multiplexing/demultiplexing units of two rows may be arranged to constitute the optical distribution unit. When the number of rows N of the arrangement of the optical multiplexing/demultiplexing units of the optical distribution unit is an odd number of 7 or more, the optical distribution unit may be configured by arranging a plurality of the first groups corresponding to the optical multiplexing/demultiplexing units of two rows and arranging one or more second groups corresponding to the optical multiplexing/demultiplexing units of three rows. Thus, the optical distribution unit can be flexibly configured according to the number of the excitation light sources and the number of the optical amplification units, and it is possible to simplify the manufacturing process of the optical repeater and to achieve the further cost reduction.

In the above description, the configuration in which two groups of two rows (G1 and G2) and one group of three rows (G3) are arranged has been described, and however, this is merely an example. Therefore, an arbitrary number of groups of two rows and arbitrary number of groups of three rows may be arranged according to the number of optical amplifiers. Further, a group of four or more rows may be included, or a group having the configuration of five rows according to the first example embodiment may be included.

Third Example Embodiment

Figure 11:
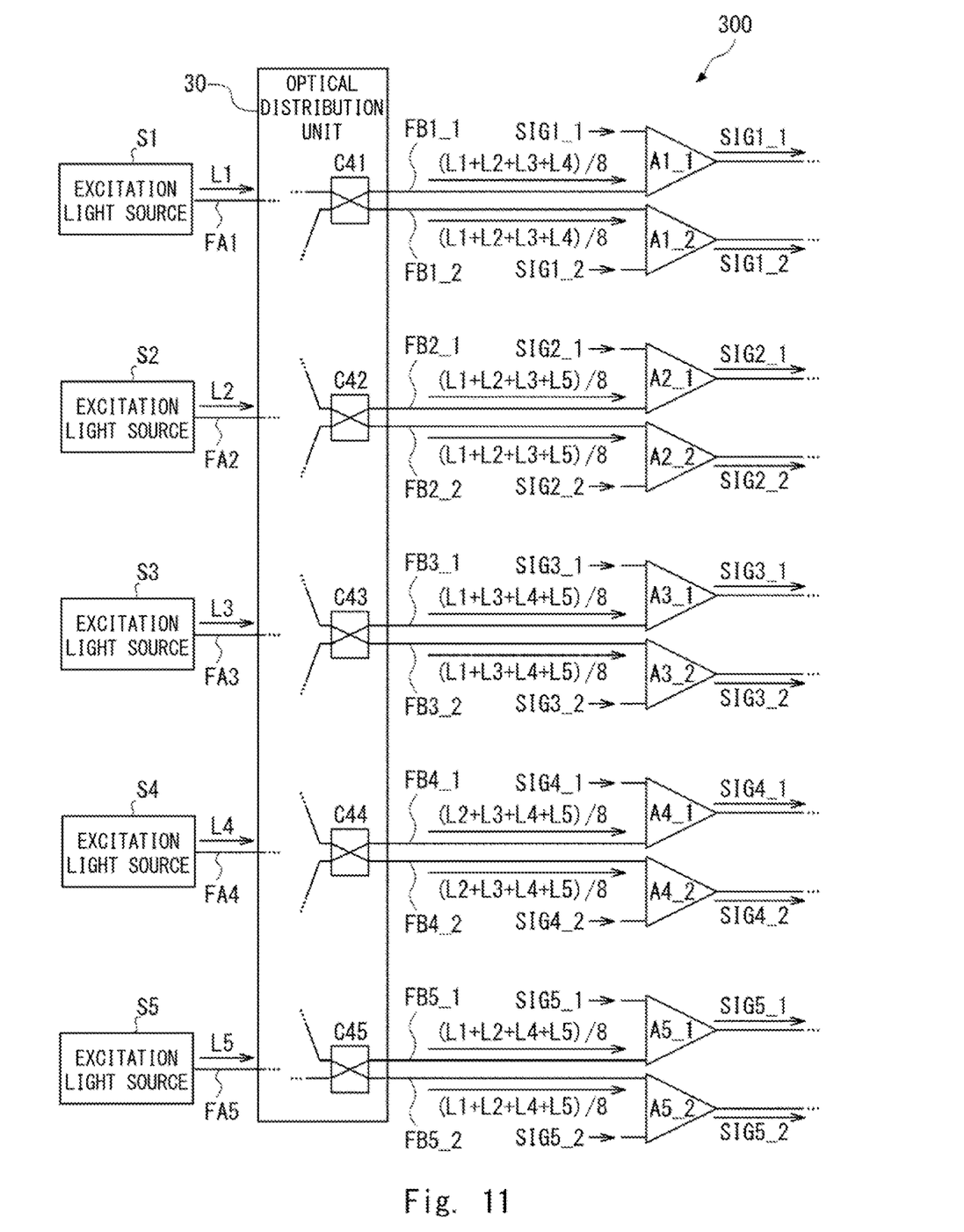
FIG. 11 is a diagram schematically showing a configuration of an optical repeater according to a third example embodiment.

An optical repeater 300 according to a third example embodiment will be described. The optical repeater 300 is a modified example of the optical repeater 100 and has a configuration for supplying the excitation light to the optical amplification unit connected to a fiber pair.

FIG. 11 schematically shows a configuration of the optical repeater 300 according to the third example embodiment. In the optical repeater 300, the optical distribution unit 10 of the optical repeater 100 is replaced with an optical distribution unit 30, and the number of optical amplification units is doubled.

The optical distribution unit 30 has a configuration in which the optical multiplexing/demultiplexing units C31 to C35 of the optical distribution unit 10 are replaced with optical multiplexing/demultiplexing units C41 to C45. Hereinafter, the optical multiplexing/demultiplexing units C41 to C45 are also referred to as the third optical multiplexing/demultiplexing units as well as the optical multiplexing/demultiplexing units C31 to C35.

The optical multiplexing/demultiplexing units C41 to C45 are optical multiplexing/demultiplexing units having two-input/two-output (2×2), and are configured as, for example, optical couplers. The connection relationship between the optical multiplexing/demultiplexing units C21 to C25 and the optical multiplexing/demultiplexing units C41 to C45 is the same as the connection relationship between the optical multiplexing/demultiplexing units C21 to C25 and the optical multiplexing/demultiplexing units C31 to C35.

When k is an integer from 1 to 5, the output (output port) of the optical multiplexing/demultiplexing unit C4$k$ is optically connected to the optical amplification units Ak_1 and Ak_2 through the optical fibers FBk_1 and FBk_2, respectively. Therefore, the optical multiplexing/demultiplexing unit C4$k$ receives the lights from different two of the optical multiplexing/demultiplexing units C21 to C25 and outputs the received lights to the optical amplification units Ak_1 and Ak_2.

The output of the optical amplification unit Ak_1 is connected to one of the fiber pair, and the output of the optical amplification unit Ak_2 is connected to the other of the fiber pair. The optical amplification units Ak_1 and Ak_2 respectively amplify the signals SIGk_1 and SIGk_2 by using the excitation lights received from the optical multiplexing/demultiplexing unit C4$k$, and output the amplified signals to the fiber pair.

As described above, according to the present configuration, even in the configuration in which the optical amplification unit is disposed according to the fiber pair, the excitation lights can be suitably distributed to the optical amplification units by branching the excitation lights by the optical multiplexing/demultiplexing unit of the optical distributing unit.

In the optical repeater according to the second example embodiment, it is needless to say that the optical multiplexing/demultiplexing units C31 to C37 of the optical distribution unit 20 may be replaced with the two-input/two-output optical multiplexing/demultiplexing units to distribute the excitation lights to the optical amplification units corresponding to the fiber pairs.

Other Example Embodiments

The present invention is not limited to the above-described exemplary embodiments, and can be modified as appropriate without departing from the scope of the invention. For example, in the above-described example embodiment, an optical coupler is exemplified as the optical multiplexing/demultiplexing unit. However, as long as a similar optical multiplexing/demultiplexing unit can be realized, the optical multiplexing/demultiplexing unit may be configured as an arbitrary optical component.

The excitation light source may be any light source. As the excitation light source, various kinds of semiconductor lasers such as a wavelength-tunable laser can be used.

The present invention has been described above with reference to the exemplary embodiments, but the present invention is not limited to the above exemplary embodiments. The configuration and details of the present invention can be modified in various ways which can be understood by those skilled in the art within the scope of the invention.

This application is based upon and claims the benefit of priority from Japanese patent application No. 2019-183666, filed Oct. 4, 2019, the disclosure of which is incorporated herein in its entirety by reference.

REFERENCE SIGNS LIST 100, 200, 300, 900 OPTICAL REPEATERS
1000 OPTICAL COMMUNICATION SYSTEM
S1-S7 EXCITATION LIGHT SOURCES
10, 20, 30, 90 OPTICAL DISTRIBUTION UNITS
A1-A7, A1_1, A1_2, A2_1, A2_2, A3_1, A3_2, A4_1, A4_2, A5_1, A5_2 OPTICAL AMPLIFICATION UNITS
C11-C17, C21-C27, C31-C37, C41-C45 OPTICAL MULTIPLEXING/DEMULTIPLEXING UNITS
FA1-FA5, FB1-FB5, FB1_1, FB1_2, FB2_1, FB2_2, FB3_1, FB3_2, FB4_1, FB4_2, FB5_1, FB5_2 OPTICAL FIBERS
L1-L7 LIGHTS
SIG1-SIG7, SIG1_1, SIG1_2, SIG2_1, SIG2_2, SIG3_1, SIG3_2, SIG4_1, SIG4_2, SIG5_1, SIG5_2 SIGNALS
G1-G3 GROUPS

What is claimed is:

1. An optical repeater comprising:
five or more excitation light sources;
a plurality of optical amplification units each configured to amplify an optical signal by using lights output from the excitation light sources; and
an optical distribution unit including a plurality of optical multiplexing/demultiplexing units,
wherein
the optical distribution unit is configured in such a manner that the lights output from four different excitation light sources in the five or more excitation light sources are input to each optical amplification unit in the plurality of optical amplification units,
N is an integer greater than or equal to 5,
the optical distribution unit comprises:
N first optical multiplexing/demultiplexing units configured to branch each of the N lights output from N excitation light sources into two lights;
N second optical multiplexing/demultiplexing units, wherein two inputs of each of the N second optical multiplexing/demultiplexing units are optically connected to outputs of two different first optical multiplexing/demultiplexing units in the N first optical multiplexing/demultiplexing units, respectively; and
N third optical multiplexing/demultiplexing units configured to output the excitation lights generated by multiplexing input lights to the plurality of optical amplification units, two inputs of each of the N third optical multiplexing/demultiplexing units being optically connected to outputs of two different second optical multiplexing/demultiplexing units in the N second optical multiplexing/demultiplexing units, respectively,
two first optical multiplexing/demultiplexing units to which the k-th second optical multiplexing/demultiplexing unit is connected are different from two first optical multiplexing/demultiplexing units to which the (k+2)-th second optical multiplexing/demultiplexing unit is connected, where k is an integer from 1 to N−2,
each of the m-th second optical multiplexing/demultiplexing unit is optically connected to the (m−1)-th third optical multiplexing/demultiplexing unit and the (m+1)-th third optical multiplexing/demultiplexing unit, where m is an integer from 2 to N−1,
the first one of the second optical multiplexing/demultiplexing unit is optically connected to the first and second ones of the third optical multiplexing/demultiplexing units, and
the N-th second optical multiplexing/demultiplexing unit is optically connected to the (N−1)-th and N-th third optical multiplexing/demultiplexing units.

2. An optical repeater comprising:
five or more excitation light sources;
a plurality of optical amplification units each configured to amplify an optical signal by using light output from the excitation light sources; and
an optical distribution unit including a plurality of optical multiplexing/demultiplexing units,
wherein:
the optical distribution unit is configured in such a manner that the lights output from four different excitation light sources in the five or more excitation light sources are input to each optical amplification unit in the plurality of optical amplification units,
N is an integer greater than or equal to 6,
the optical distribution unit comprises:
N first optical multiplexing/demultiplexing units configured to branch each of the N lights output from N excitation light sources into two lights;
N second optical multiplexing/demultiplexing units, wherein two inputs of each of the N second optical multiplexing/demultiplexing units are optically connected to outputs of two different first optical multiplexing/demultiplexing units in the N first optical multiplexing/demultiplexing units, respectively; and
N third optical multiplexing/demultiplexing units configured to output the excitation lights generated by multiplexing input lights to the plurality of optical amplification units,
two inputs of each of the N third optical multiplexing/demultiplexing units being optically connected to outputs of two different second optical multiplexing/demultiplexing units in the N second optical multiplexing/demultiplexing units, respectively,
two of the second optical multiplexing/demultiplexing units and two of the third optical multiplexing/demultiplexing units form a first group,
three of the second optical multiplexing/demultiplexing units and three of the third optical multiplexing/demultiplexing units form a second group,
in the first group, the two of the second optical multiplexing/demultiplexing units is optically connected to the two of the third optical multiplexing/demultiplexing units, respectively,
in the second group, the first one of the second optical multiplexing/demultiplexing units is optically connected to the first and second ones of the third optical multiplexing/demultiplexing units, the second one of the second optical multiplexing/demultiplexing units is optically connected to the first and third ones of the third optical multiplexing/demultiplexing units, the third one of the second optical multiplexing/demultiplexing units is optically connected to the second and third ones of the third optical multiplexing/demultiplexing units, when N is an even number, the optical distribution unit includes a plurality of the first groups, and when N is an odd number, the optical distribution unit includes a plurality of the first groups and one or more second groups.

3. The optical repeater according to claim 1, wherein the N third optical multiplexing/demultiplexing units output the excitation lights to the N optical amplification units, respectively.

4. The optical repeater according to claim 1, wherein:

2N optical amplification units form N pairs of optical amplification units and each pair includes two optical amplification units, and each of the N third optical multiplexing/demultiplexing units branches the excitation light generated by multiplexing the input lights into two excitation lights, and outputs the two excitation lights to the two optical amplification units included in one pair of the N pairs of optical amplification units.

5. An optical communication system comprising:

an optical transmission apparatus;

an optical cable through which an optical signal transmitted and received by the optical transmission apparatus is transmitted; and an optical repeater inserted into the optical cable, wherein:

the optical repeater comprises:

five or more excitation light sources;

a plurality of optical amplification units each configured to amplify an optical signal by using lights output from the excitation light sources; and an optical distribution unit including a plurality of optical multiplexing/demultiplexing units, and the optical distribution unit is configured in such a manner that the lights output from four different excitation light sources in the five or more excitation light sources are input to each optical amplification unit in the plurality of optical amplification units N is an integer greater than or equal to 5, the optical distribution unit comprises:

N first optical multiplexing/demultiplexing units configured to branch each of the N lights output from N excitation light sources into two lights;

N second optical multiplexing/demultiplexing units, wherein two inputs of each of the N second optical multiplexing/demultiplexing units and optically connected to outputs of two different first optical multiplexing/demultiplexing units in the N first optical multiplexing/demultiplexing units, respectively; and N third optical multiplexing/demultiplexing units configured to output the excitation lights generated by multiplexing input lights to the plurality of optical amplification units, two inputs of each of the N third optical multiplexing/demultiplexing units being optically connected to outputs of two different second optical multiplexing/demultiplexing units in the N second optical multiplexing/demultiplexing units, respectively, two first optical multiplexing/demultiplexing units to which the k-th second optical multiplexing/demultiplexing unit is connected are different from two first optical multiplexing/demultiplexing units to which the (k+2)-th second optical multiplexing/demultiplexing unit is connected, where k is an integer from 1 to N−2, each of the m-th second optical multiplexing/demultiplexing unit is optically connected to the (m−1)-th third optical multiplexing/demultiplexing unit and the (m+1)-th third optical multiplexing/demultiplexing unit, where m is an integer from 2 to N−1, the first one of the second optical multiplexing/demultiplexing unit is optically connected to the first and second ones of the third optical multiplexing/demultiplexing units, and the N-th second optical multiplexing/demultiplexing unit is optically connected to the (N−1)-th and N-th third optical multiplexing/demultiplexing units.

6. The optical communication system according to claim 5, wherein the N third optical multiplexing/demultiplexing units output the excitation lights to the N optical amplification units, respectively.

7. The optical communication system according to claim 5, wherein:

2N optical amplification units form N pairs of optical amplification units and each pair includes two optical amplification units, and each of the N third optical multiplexing/demultiplexing units branches the excitation light generated by multiplexing the input lights into two excitation lights, and outputs the two excitation lights to the two optical amplification units included in one pair of the N pairs of optical amplification units.

* * * * *